(12) United States Patent  
Anderson (10) Patent No.: US 12,085,060 B1  
(45) Date of Patent: Sep. 10, 2024

(54) WIND-POWERED ELECTRICITY GENERATING SYSTEM

(71) Applicant: Edward Anderson, Emgrant, MT (US)

(72) Inventor: Edward Anderson, Emgrant, MT (US)

( * ) Notice: Subject to any disclaimer, the term of this patent is extended or adjusted under 35 U.S.C. 154(b) by 0 days.

(21) Appl. No.: 18/229,758

(22) Filed: Aug. 3, 2023

(51) Int. Cl.
| | |
|---|---|
| *F03D 5/00* | (2006.01) |
| *B60L 53/52* | (2019.01) |
| *B60L 53/53* | (2019.01) |
| *F03D 9/11* | (2016.01) |
| *F03D 9/25* | (2016.01) |
| *H02K 7/18* | (2006.01) |

(52) U.S. Cl.
CPC ............... *F03D 5/00* (2013.01); *B60L 53/52* (2019.02); *B60L 53/53* (2019.02); *F03D 9/11* (2016.05); *F03D 9/25* (2016.05); *H02K 7/183* (2013.01); *F05B 2220/706* (2013.01)

(58) Field of Classification Search
CPC ..... F03D 5/00; F03D 9/11; F03D 9/25; B60L 53/52; B60L 53/53; H02K 7/183; F05B 2220/706

See application file for complete search history.

(56) References Cited

U.S. PATENT DOCUMENTS

| | | | |
|---|---|---|---|
| 6,870,280 B2 | 3/2005 | Pechler | |
| D560,161 S | 1/2008 | Martinez | |
| 7,573,148 B2 | 8/2009 | Nica | |
| 8,400,008 B2 | 3/2013 | Gyorgyi | |
| 8,591,171 B1 * | 11/2013 | Maynard | F03D 3/0409 415/4.4 |
| 8,961,103 B1 * | 2/2015 | Wolff | F03D 3/02 415/4.4 |
| 9,103,324 B2 * | 8/2015 | Son | F03D 3/04 |
| 9,803,623 B2 | 10/2017 | Burkle | |
| D950,491 S | 5/2022 | Bryan | |
| 2018/0003156 A1 * | 1/2018 | Christ | F03D 3/005 |

FOREIGN PATENT DOCUMENTS

WO   WO2009056896   5/2009

\* cited by examiner

*Primary Examiner* — Joseph Ortega (57) ABSTRACT

A wind-powered electricity generating system for converting kinematic energy from wind into electricity includes a turbine comprising a duct wherein a pressure differential causes air to open a door to the duct, move along a channel in the duct, push a paddle along the channel, and release from the turbine through an inner chamber and an outlet. The paddle is coupled to a shaft such that the paddle rotates the shaft when the air moves the paddle through the channel. The shaft operates an electric generator, which thus produces electricity.

15 Claims, 11 Drawing Sheets

WIND-POWERED ELECTRICITY GENERATING SYSTEM

BACKGROUND OF THE INVENTION

(1) Field of the Invention

The disclosure relates to electricity generating system and more particularly pertains to a new electricity generating system for converting kinematic energy from wind into electricity.

(2) Description of Related Art Including Information Disclosed Under 37 CFR 1.97 and 1.98

The prior art discloses myriad exampled of wind-powered electricity generating systems. However, the prior art fails to describe such a system in which a pressure differential between the atmosphere and an interior space defined by the system causes air to flow into an internal channel which pushes paddles to rotate a shaft attached to an electric generator. Such a system is a useful alternative to the systems of the prior art and may be used to, for example, charge electric vehicles.

BRIEF SUMMARY OF THE INVENTION

An embodiment of the disclosure meets the needs presented above by generally comprising a turbine section comprising a duct having a bottom wall, a top wall, an inner wall, and an outer wall. Each of the inner wall and the outer wall is coupled to and extends between the bottom wall and the top wall and has a cylindrical shape. An outer channel is defined between the inner wall and the outer wall, and an inner chamber is defined within the inner wall. The inner wall has an aperture extending therethrough, and the outer wall has an opening extending therethrough. The turbine section further comprises a shaft, an arm, and a paddle. The shaft is mounted in the inner chamber of the duct and is oriented vertically. The arm is coupled to and extends radially from the shaft. The arm extends through a circumferential slot in the inner wall of the duct. The paddle is coupled to the arm and is positioned in the outer channel of the duct. The paddle is movable through the outer channel in each of a first rotational direction and a second rotational direction opposite the first rotational direction around the inner wall.

The turbine section further comprises a door coupled to the outer wall of the duct and is movable between an open position and a closed position with respect to the opening. The door is angled when in the open position such that the door is configured to direct air flowing through the opening to move in the first rotational direction around the inner wall. The door is also positioned adjacent to the aperture of the inner wall such that the door is configured to direct air flowing through the outer channel in the first direction through the associated aperture into the inner chamber. The paddle is configured to be moved by the air through the outer channel in the first rotational direction when the air flows through the outer channel in the first rotational direction. The turbine section has an outlet extending through the top wall to the inner chamber. A generator is operatively coupled to the shaft of the turbine section.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
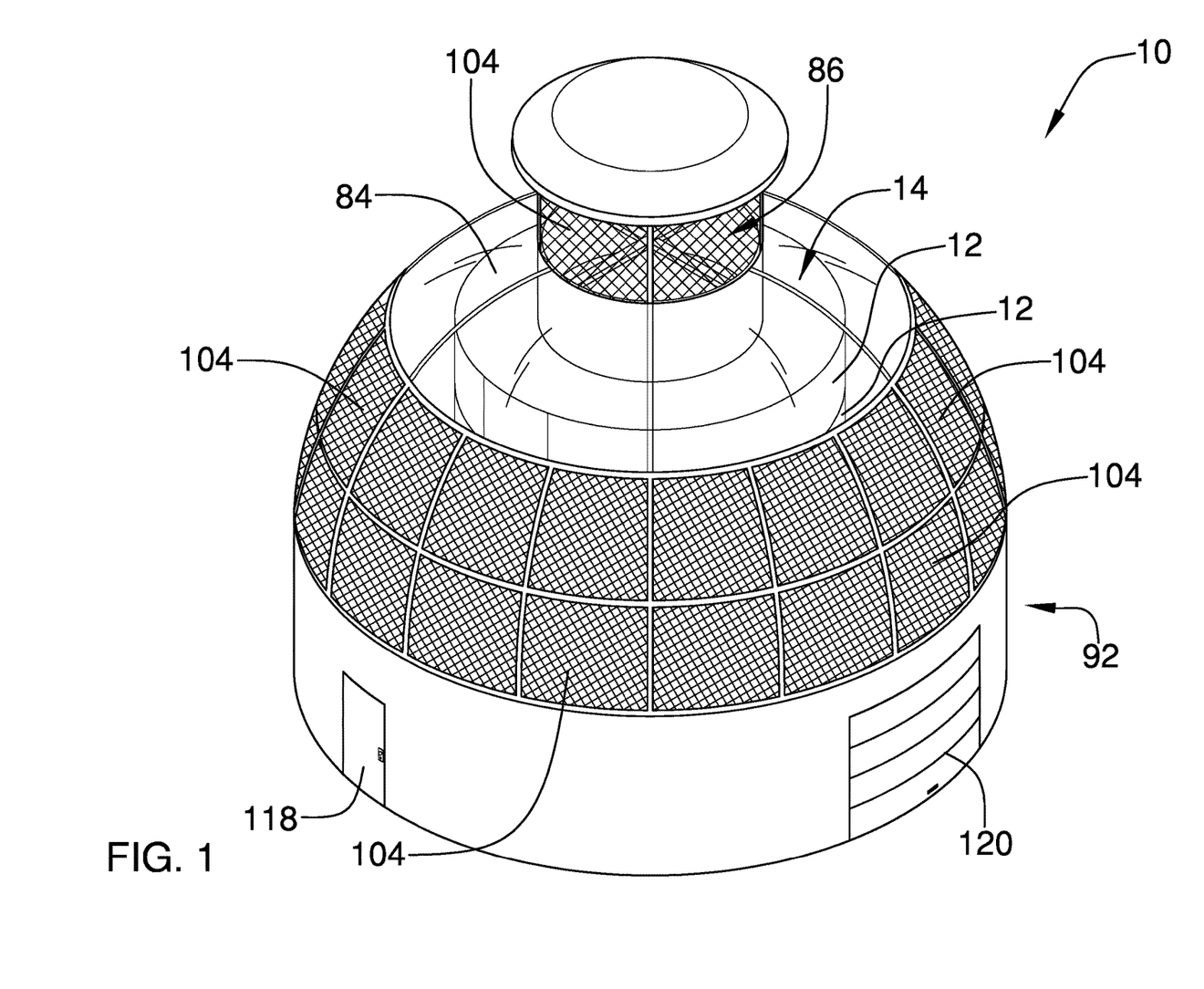
FIG. 1 is a perspective view of a wind-powered electricity generating system according to an embodiment of the disclosure.
Figure 2:
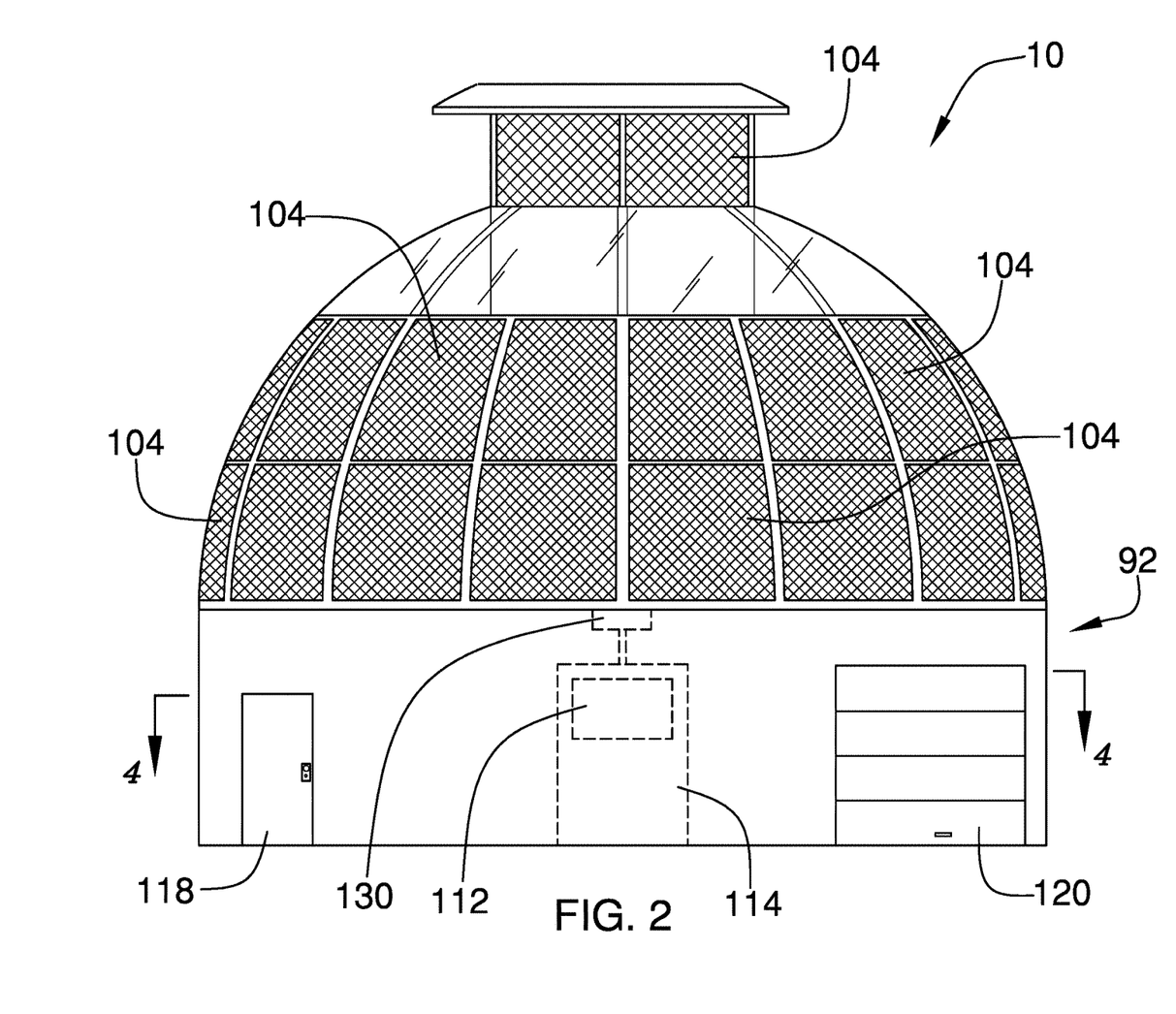
FIG. 2 is a front view of an embodiment of the disclosure.
Figure 3:
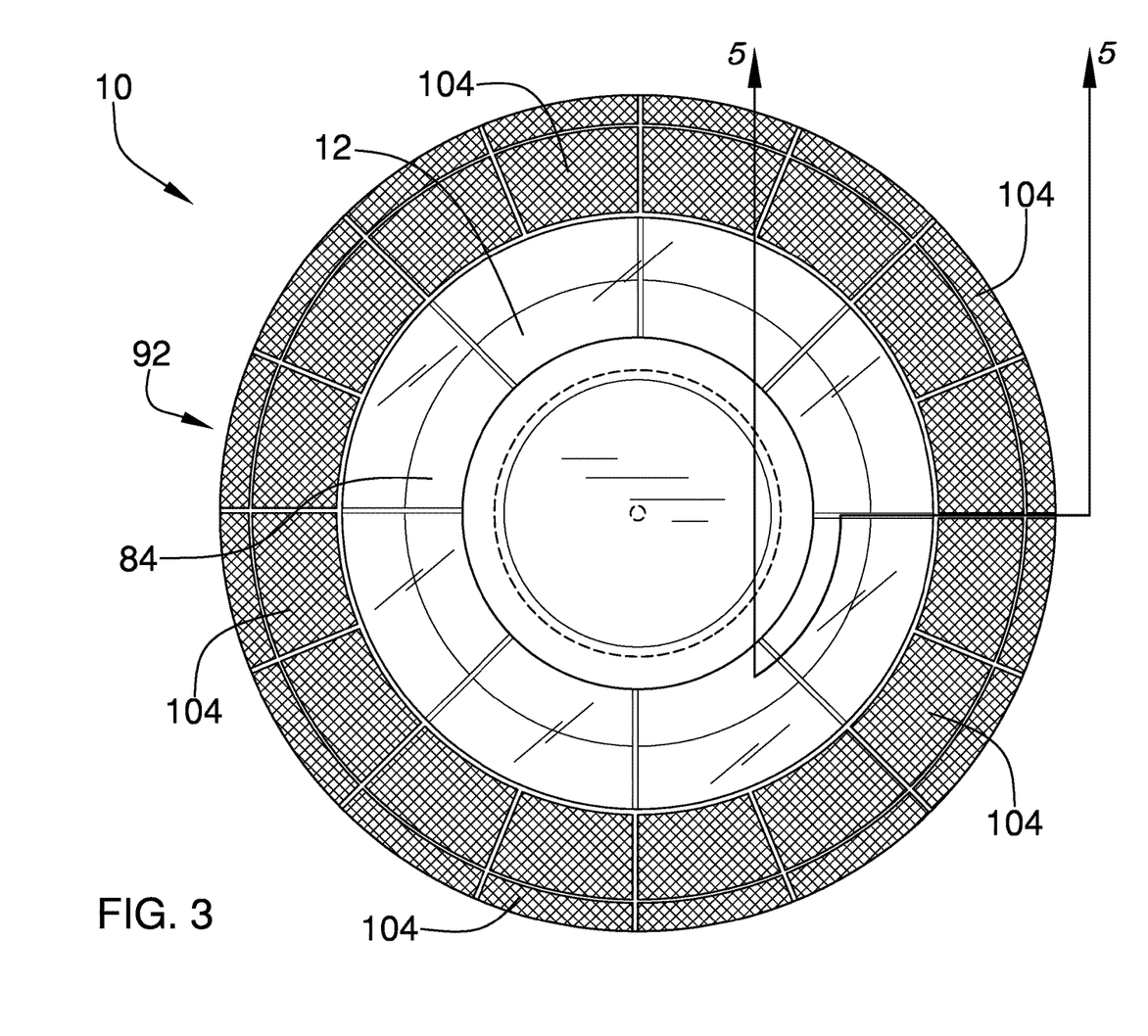
FIG. 3 is a top view of an embodiment of the disclosure.
Figure 4:
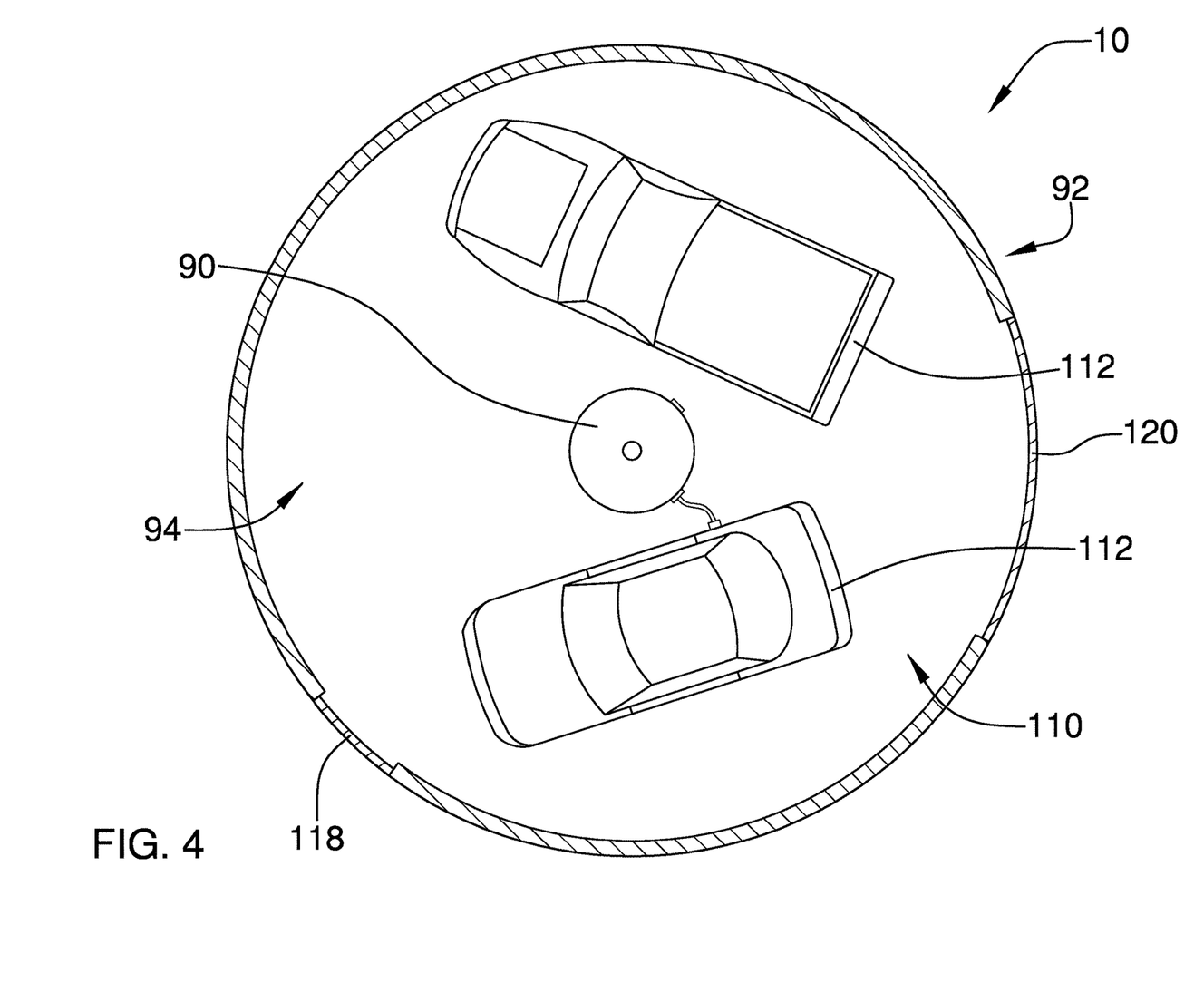
FIG. 4 is a cross-section view of an embodiment of the disclosure taken from Arrows 4-4 in FIG. 2.
Figure 5:
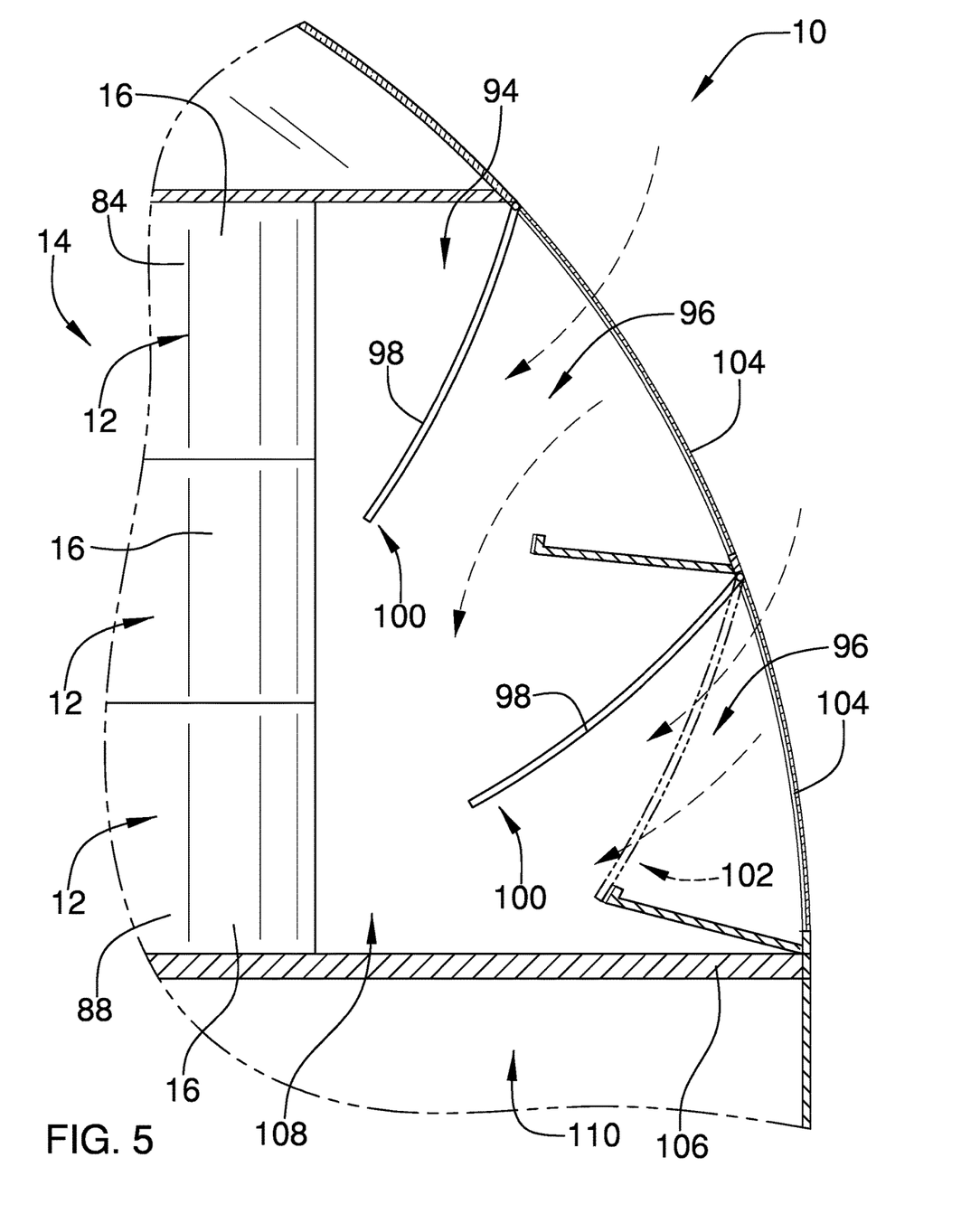
FIG. 5 is a cross-section view of an embodiment of the disclosure taken from Arrows 5-5 in FIG. 3.
Figure 6:
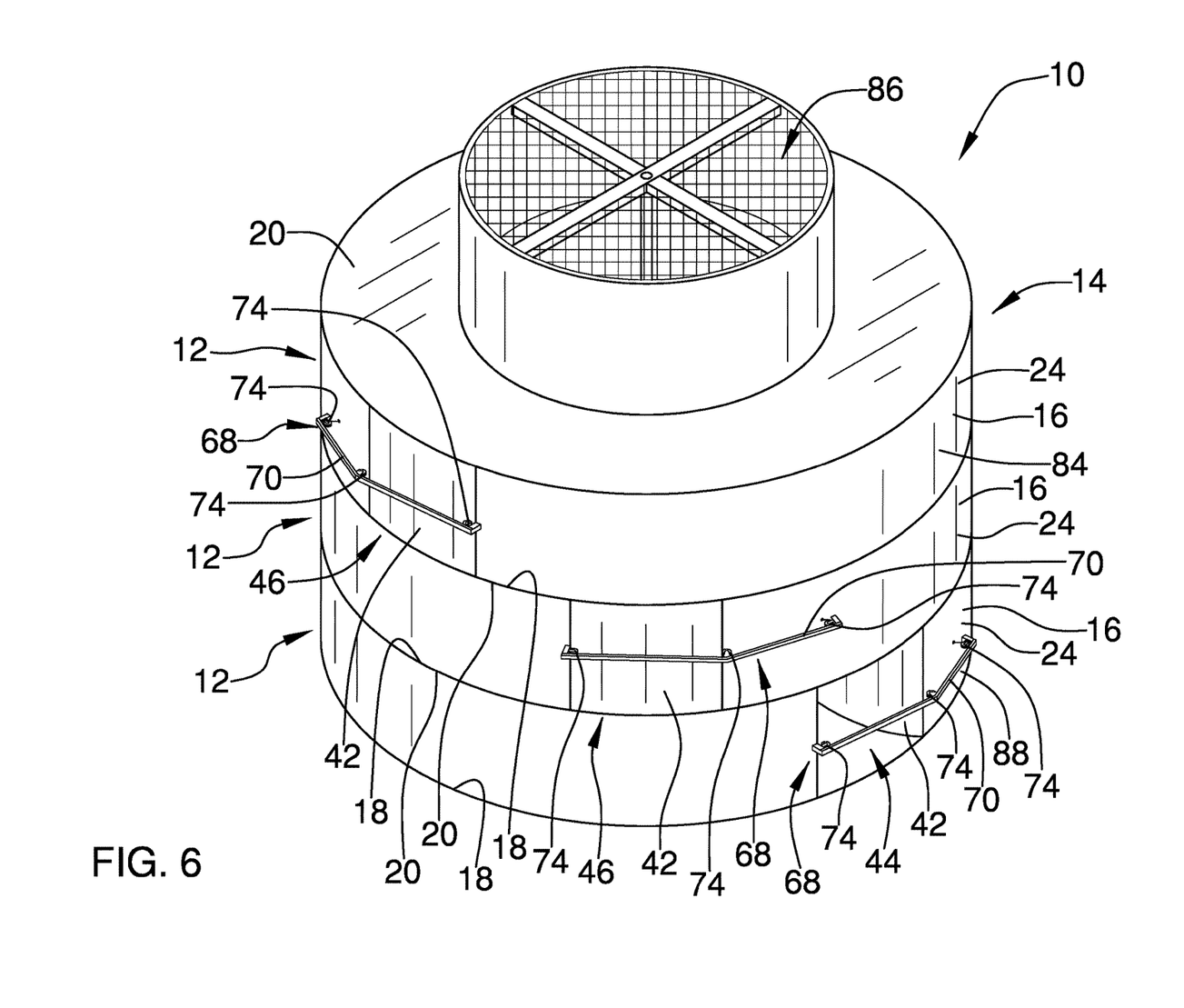
FIG. 6 is a perspective view of a plurality of turbine sections of an embodiment of the disclosure.
Figure 7:
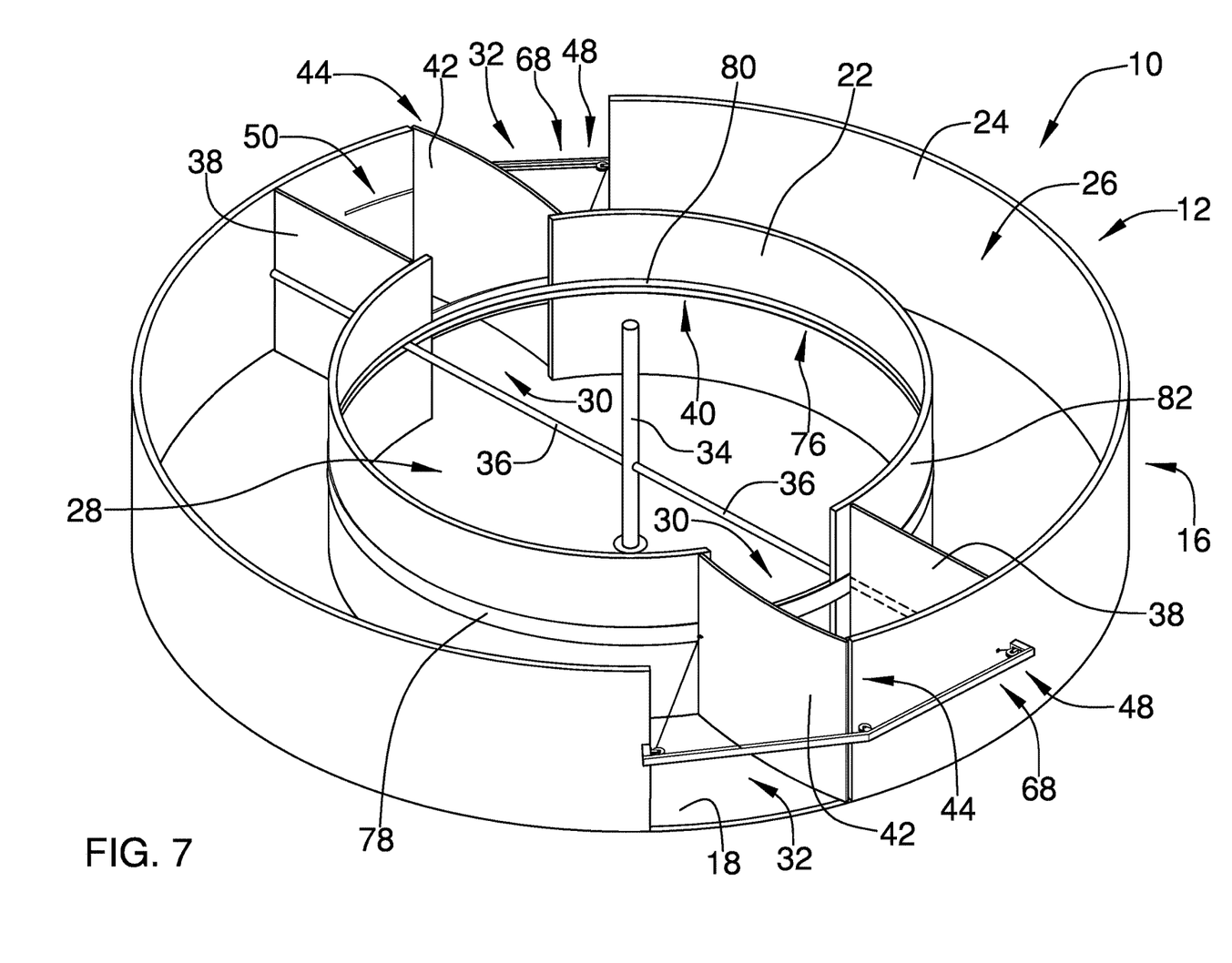
FIG. 7 is a perspective view of one of a plurality of turbine sections an embodiment of the disclosure with a top wall of the one turbine section removed.
Figure 8:
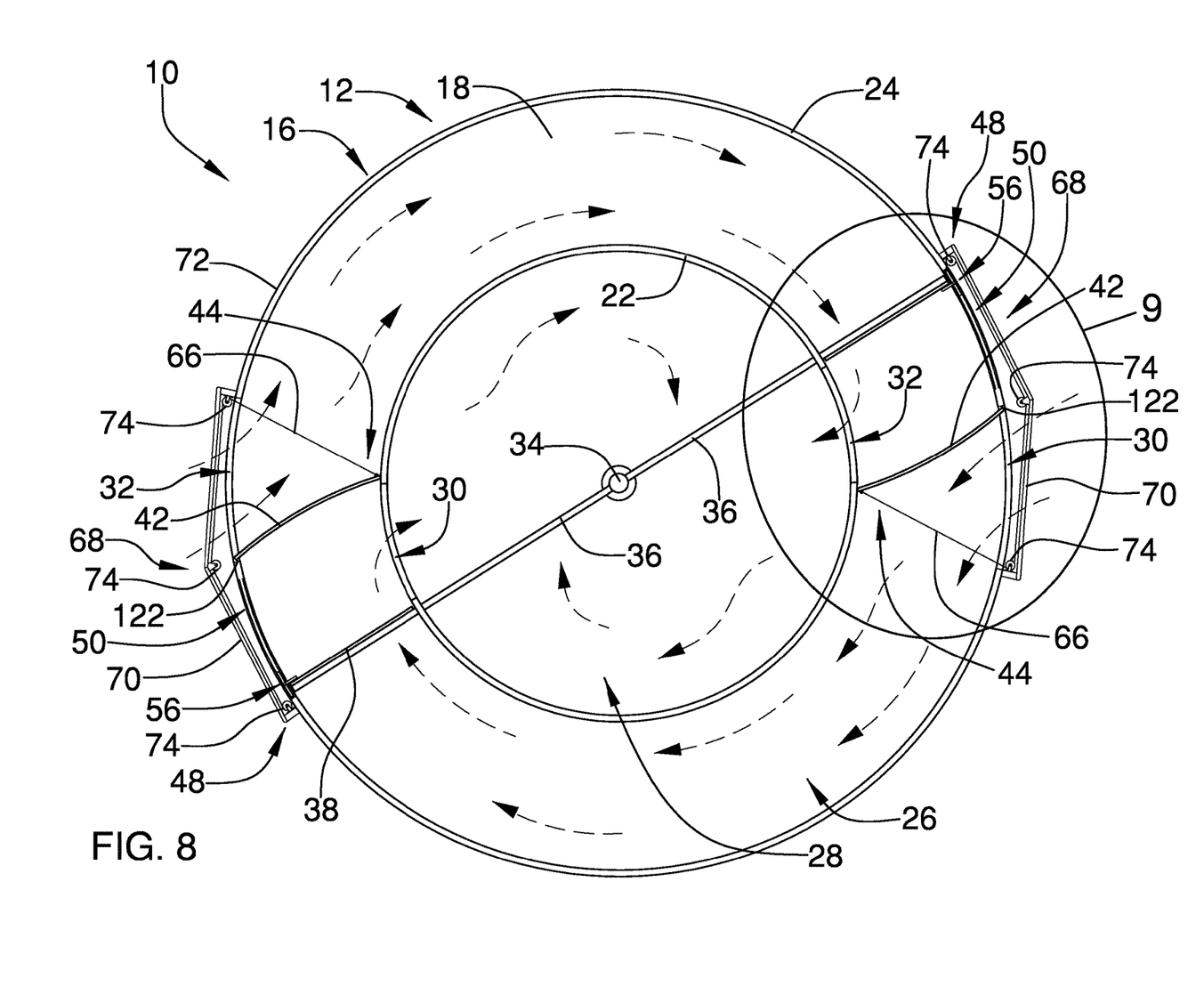
FIG. 8 is a top view of the one turbine section of an embodiment of the disclosure with the top wall removed.
Figure 9A:
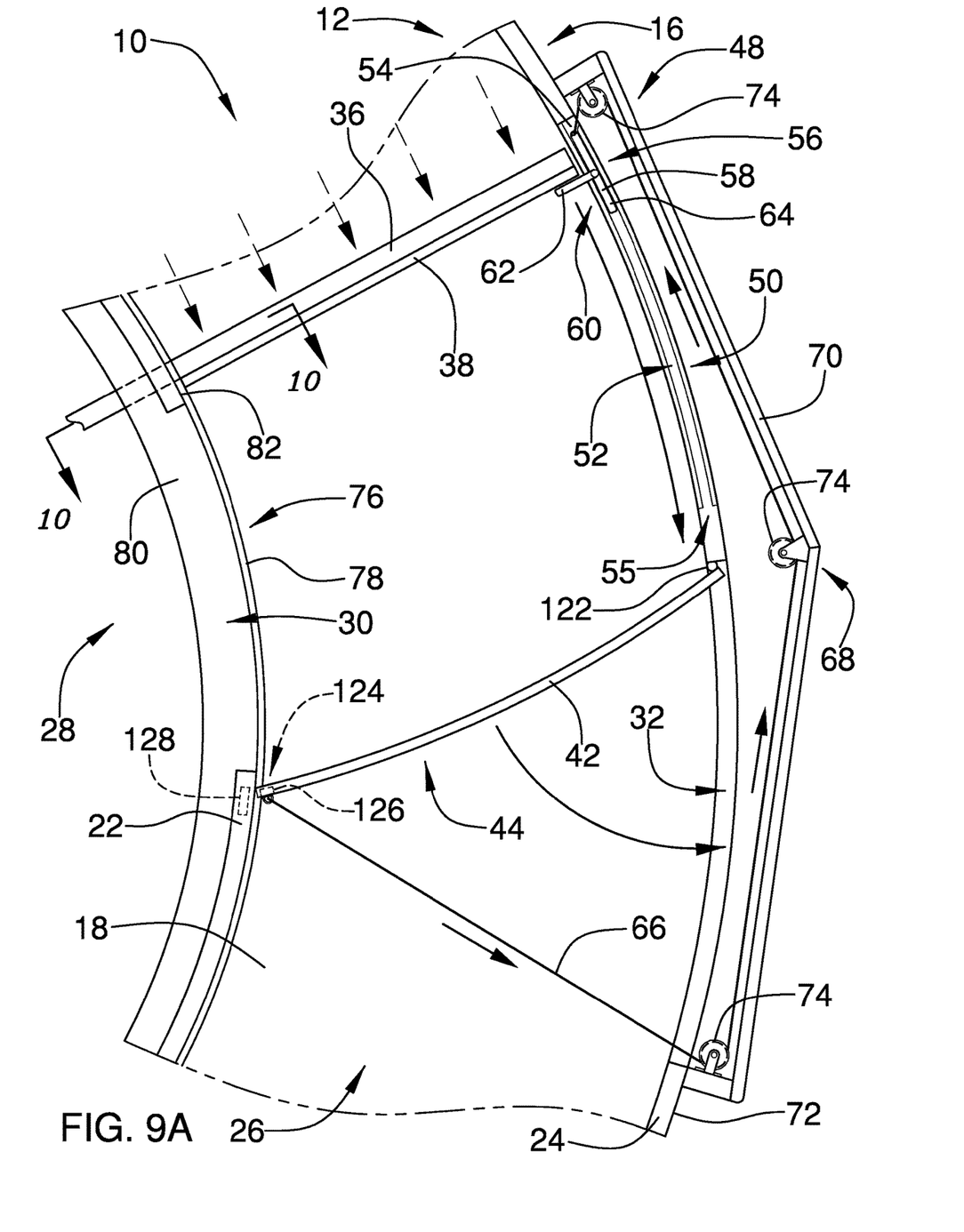
FIG. 9A is a detail view of the one turbine section of an embodiment of the disclosure taken from Circle 9 in FIG. 8 depicting a closure of a door via a closure mechanism.
Figure 9B:
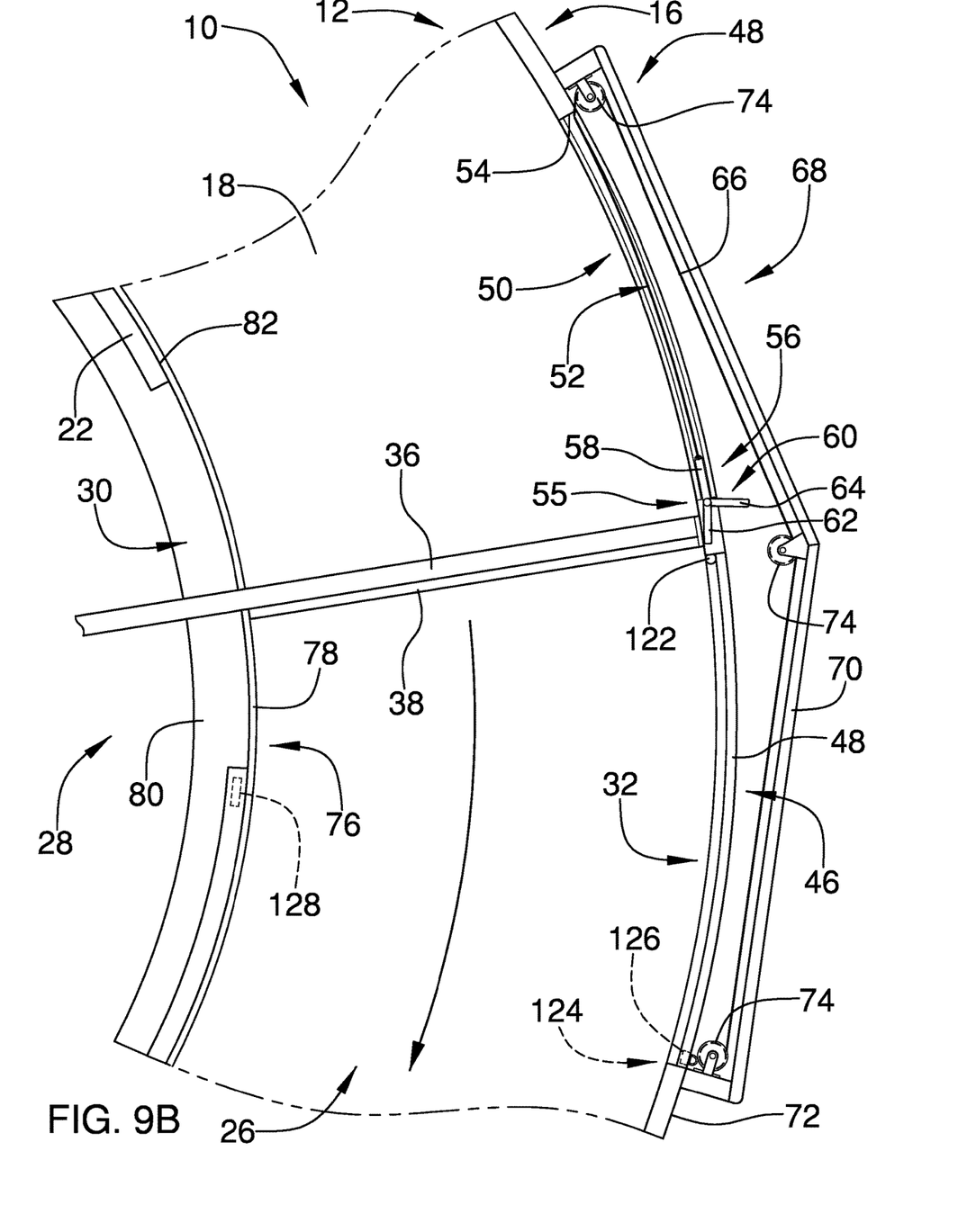
FIG. 9B is a detail view of the one turbine section of an embodiment of the disclosure taken from Circle 9 in FIG. 8 depicting the door having been closed via the closure mechanism.
Figure 10:
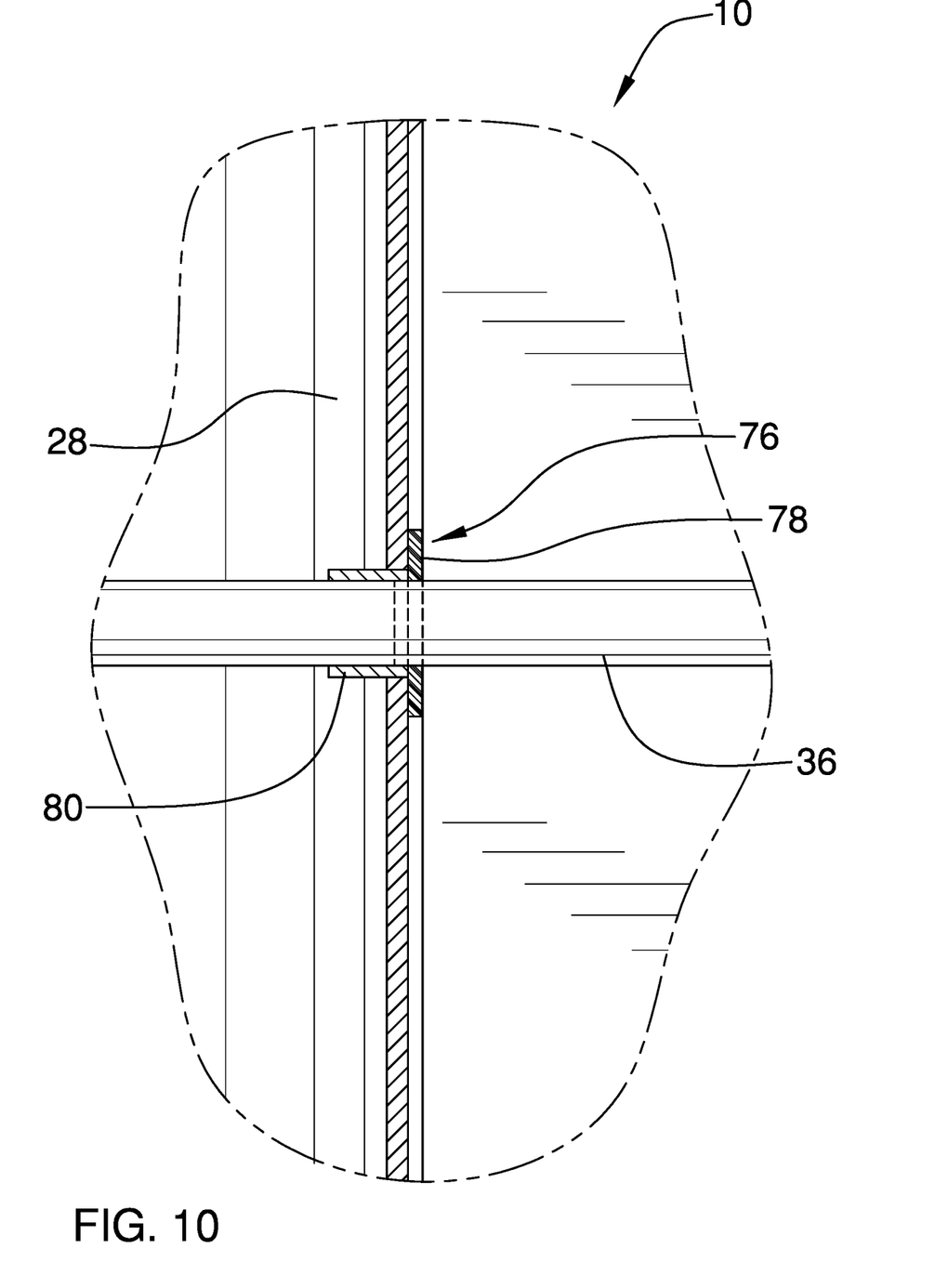
FIG. 10 is a cross-section view of an embodiment of the disclosure taken from Arrows 10-10 in FIG. 9A.

With reference now to the drawings, and in particular to FIGS. 1 through 6 thereof, a new electricity generating system embodying the principles and concepts of an embodiment of the disclosure and generally designated by the reference numeral 10 will be described.

As best illustrated in FIGS. 1 through 6, the wind-powered electricity generating system 10 generally comprises a plurality of turbine sections 12 arranged in a stack 14. Each turbine section 12 of said plurality of turbine sections 12 comprises a duct 16 having a bottom wall 18, a top wall 20, an inner wall 22, and an outer wall 24. Each of the inner wall 22 and the outer wall 24 is coupled to and extends between the bottom wall 18 and the top wall 20 and has a cylindrical shape. An outer channel 26 is defined between the inner wall 22 and the outer wall 24, and an inner chamber 28 is defined within the inner wall 22. The inner wall 22 has a pair of apertures 30 extending therethrough which are positioned opposite each other. The outer wall 24 has a pair of openings 32 extending therethrough which are positioned opposite each other.

Each turbine section 12 of said plurality of turbine sections 12 further comprises a shaft 34, a pair of arms 36, and a pair of paddles 38. The shaft 34 is mounted in the inner chamber 28 of the duct 16 and is oriented vertically. Each arm 36 of the pair of arms 36 is coupled to and extends radially from the shaft 34. Each arm 36 of the pair of arms 36 extends through a circumferential slot 40 in the inner wall 22 of the duct 16. Each paddle 38 of the pair of paddles 38 is coupled to an associated arm 36 of the pair of arms 36 and is positioned in the outer channel 26 of the duct 16. The pair of paddles 38 is movable through the outer channel 26 in only a first rotational direction. One or more one-way bearings 130, such as sprag clutch bearings or the like, are coupled to the shaft 34 of at least one of the plurality of turbine sections 12 to inhibit rotation of the pair of paddles 38 of each turbine section 12 in a second rotational direction opposite the first rotational direction around the inner wall 22. Each paddle 38 of the pair of paddles 38 extends from the inner wall 22 to the outer wall 24 and from the top wall 20 to the bottom wall 18 to prevent air from flowing through the outer channel 26 around the paddles 38. Each paddle 38 of the pair of paddles 38 is configured to be moved by the air through the outer channel 26 in the first rotational direction when the air flows through the outer channel 26 in the first rotational direction.

Each turbine section 12 of the pair of turbine sections 12 further comprises a pair of doors 42. Each door 42 of the pair of doors 42 is coupled to the outer wall 24 of the duct 16 and is movable between an open position 44 and a closed position 46 with respect to an associated one of the pair of openings 32. Each door 42 of the pair of doors 42 extends from the outer wall 24 to the inner wall 22 and from the top wall 20 to the bottom wall 18 when in the open position 44 such that the door 42 is configured to permit air flowing through the associated opening 32 to move only in the first rotational direction around the inner wall 22. Each door 42 of the pair of doors 42 is positioned adjacent to an associated aperture 30 of the pair of apertures 30 of the inner wall 22 such that the door 42 is configured to direct air flowing through the outer channel 26 in the first direction through the associated aperture 30 into the inner chamber 28.

The doors 42 of the pair of doors 42 are biased toward the open position 44 via spring hinges 122 and retained in the open position 44 via retainers 124. Each of the retainers 124 comprises a first mating member 126 that is mounted to the associated door 42 and a second mating member 128 that is mounted to the inner wall 22. The first and second mating members 124, 126 mate with each other to retain the associated door 42 in the open position 44. The first and second mating members 126, 128 are mated via magnetic attraction but may be mated via a friction fit, snap fit, latch engagement, or the like.

Each turbine section 12 of the pair of turbine sections 12 further comprises a pair of closure mechanisms 48. Each closure mechanism 48 of the pair of closure mechanisms 48 is operatively coupled to an associated one of the pair of doors 42 and is actuatable by either paddle 38 of the pair of paddles 38 to close the associated door 42 when either paddle 38 approaches the associated door 42. Operation of each closure mechanism 48 of the pair of closure mechanisms 48 causes the retainer 124 that retains the associated door 42 in the open position 44 to release the associated door 42, thus allowing the associated door 42 to close. Each closure mechanism 48 of the pair of closure mechanisms 48 comprises a track 50, a slider 56, a cable 66, and a guide 68. The track 50 is mounted to the outer wall 24 and is spaced from the associated door 42 in the second rotational direction. The track 50 comprises a groove 52 extending through the outer wall 24 from a closed end 54 to an open end 55 adjacent to the associated door 42.

The slider 56 is slidably mounted to the track 50 and is positioned such that each paddle 38 of the pair of paddles 38 engages the slider 56 when the paddle 38 approaches the associated door 42 such that the slider 56 moves along the track 50. The slider 56 comprises a base member 58 and an engagement member 60, in which the base member 58 is positioned in the groove 52 and the engagement member 60 is pivotably coupled to the base member 58. A first portion 62 of the engagement member 60 extends inwardly from the outer wall 24 when the slider 56 is positioned at the closed end 54 of the groove 52 to engage either paddle 38 of the pair of paddles 38. A second portion 64 of the engagement member 60 is positioned in the groove 52 when the slider 56 is positioned at the closed end 54 of the groove 52 to maintain an orientation of the first portion 62 with respect to the groove 52. The second portion 64 extends out of the groove 52 when the slider 56 is positioned at the open end 55 of the groove 52 such that the engagement member 60 is pivotable outwardly from the outer wall 24 to disengage from the paddle 38.

The cable 66 is coupled to and extends between the slider 56 and the associated door 42, and the guide 68 is coupled to the cable 66 such that the cable 66 is directed to pull the associated door 42 toward the closed position 46 when the slider 56 is moved toward the associated door 42. The guide 68 comprises a frame 70 mounted on an exterior 72 of the outer wall 24 and a plurality of pulleys 74 mounted to the frame 70. The cable 66 engages each of the plurality of pulleys 74 such that the cable 66 extends along a path extending from the associated door 42 to the opening 32 associated with the associated door 42 and from the opening 32 around the outer wall 24 to the slider 56. The guide 68 engages the cable 66 to move along the path when the slider 56 moves toward the door 42. When the slider 56 is not being moved by one of the paddles 38, one of the spring hinges 122 acts on the associated door 42 to open the associated door 42 and move the slider 56 via the cable 66 away from the associated door 42.

A sealing ring 76 is coupled to the pair of arms 36 and is positioned in the circumferential slot 40 of the inner wall 22. The sealing ring 76 forms a seal with the inner wall 22 such that the sealing ring 76 is configured for preventing air from moving through the circumferential slot 40. The sealing ring 76 comprises a sealing member 78 which engages an exterior surface 82 of the inner wall 22 to form the seal. The sealing member 78 comprises a flexible material such that the sealing member 78 conforms to the exterior surface 82 of the inner wall 22. The sealing ring 76 comprises a support member 80 which extends through the circumferential slot 40 and comprises a rigid material to maintain a position of the sealing member 78 against the inner wall 22. The flexible material comprises polytetrafluoroethylene (PTFE) but may comprise another polymer or other suitable conventional material. The rigid material may be a metal such as a steel alloy, aluminum, or the like. The rigid material may be another conventional material suitable to maintain the position of the sealing member 78 against the inner wall 22.

The shafts 34 of the plurality of turbine sections 12 are coupled together, and the inner chambers 28 of the plurality of turbine sections 12 are in fluid communication with each other. A topmost turbine section 84 of the plurality of turbine sections 12 has an outlet 86 extending through the top wall 20 of the topmost turbine section 84 to the inner chamber 28.

A generator 90 is operatively coupled to the shaft 34 of a bottommost turbine section 88 of the plurality of turbine sections 12.

A housing 92 is coupled to and contains the plurality of turbine sections 12 and the generator 90 within an interior space 94 defined in the housing 92. The outlet 86 of the topmost turbine section 84 extends out of the interior space 94 through the housing 92. The housing 92 has a plurality of inlets 96 extending therethrough to the interior space 94. A plurality of hatches 98 is coupled to the housing 92, and each hatch 98 of the plurality of hatches 98 is movable between an open position 100 and a closed position 102 with respect to an associated one of the plurality of inlets 96. Each hatch 98 of the plurality of hatches 98 is biased toward the closed position 102. Each hatch 98 of the plurality of hatches 98 is configured to close via a gravitational force exerted on the hatch 98. Each one of a plurality of mesh screens 104 covers an associated one of the outlet 86 of the topmost turbine section 84 and the plurality of inlets 96 of the housing 92. The mesh screens 104 keep foreign matter such as birds out of the interior space 94 and the plurality of turbine sections 12.

A divider wall 106 is mounted in the housing 92 and extends horizontally such that the divider wall 106 defines an upper compartment 108 and a lower compartment 110 in the housing 92. The upper compartment 108 contains the plurality of turbine sections 12, and the lower compartment 110 contains the generator 90. The lower compartment 110 also has a size such that the lower compartment 110 is configured for containing a pair of electric vehicles 112. A charger 114 is mounted to the housing 92 and is positioned in the lower compartment 110. The charger 114 is electrically coupled to the generator 90 and comprises a battery 116 for storing electrical power produced by the generator 90. The charger 114 is configured for electrically charging each of the pair of electric vehicles 112. The generator 90 also may be electrically coupled to an electrical system for providing electrical power to a building or other electrical load. The lower compartment 110 is accessible via a personal door 118 and a vehicle door 120.

In use, when an atmospheric pressure outside of the housing 92 is greater than an atmospheric pressure of the interior space 94, air pushes at least one of the hatches 98 open and enters the interior space 94. A similar pressure differential between the interior space 94 and the outer channel 26 of one of the turbine sections 12 will cause air to open the pair of doors 42 of the one turbine section 12. Air flows through the outer channel 26 of the one turbine section 12 in the first rotational direction around the inner wall 22 and into the inner chamber 28 of the one turbine section 12 through the apertures 30 in the inner wall 22. This air flow will cause the pair of paddles 38 of the one turbine section 12 to rotate and will operate the generator 90 to generate electricity. The air will continue to flow from the inner chambers 28 of the plurality of turbine sections 12 and out of the housing 92 through the outlet 86 of the topmost turbine section 84. Electricity is stored in the battery 116 of the charger 114. The charger 114 is selectively electrically coupled to each one of the pair of electric vehicles 112 to charge the electric vehicles 112.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wind-powered electricity generating system comprising:
 a turbine section comprising:
  a duct having a bottom wall, a top wall, an inner wall, and an outer wall, each of the inner wall and the outer wall being coupled to and extending between the bottom wall and the top wall, each of the inner wall and the outer wall having a cylindrical shape, an outer channel being defined between the inner wall and the outer wall, an inner chamber being defined within the inner wall, the inner wall having an aperture extending therethrough, the outer wall having an opening extending therethrough;
  a shaft being mounted in the inner chamber of the duct and being oriented vertically;
  an arm being coupled to and extending radially from the shaft, the arm extending through a circumferential slot in the inner wall of the duct;
  a paddle being coupled to the arm and being positioned in the outer channel of the duct, the paddle being movable through the outer channel in each of a first rotational direction and a second rotational direction opposite the first rotational direction around the inner wall;
  a door being coupled to the outer wall of the duct and being movable between an open position and a closed position with respect to the opening, the door being angled when in the open position such that the door is configured to direct air flowing through the opening to move in the first rotational direction around the inner wall, the door being positioned adjacent to the aperture of the inner wall such that the door is configured to direct air flowing through the outer channel in the first direction through the associated aperture into the inner chamber;
  wherein the paddle is configured to be moved by the air through the outer channel in the first rotational direction when the air flows through the outer channel in the first rotational direction;
 the turbine section having an outlet extending through the top wall to the inner chamber; and
 a generator being operatively coupled to the shaft of the turbine section.

2. The system of claim 1, wherein the paddle extends from the inner wall to the outer wall and from the top wall to the bottom wall.

3. The system of claim 1, wherein the door extends from the outer wall to the inner wall and from the top wall to the bottom wall when in the open position such that the door is configured to permit air flowing through the associated opening to move only in the first rotational direction around the inner wall.

4. The system of claim 1, wherein the turbine section further comprises a closure mechanism being operatively coupled to the door, the closure mechanism being actuatable by the paddle to close the door when the paddle approaches the door.

5. The system of claim 4, wherein the closure mechanism comprises:
   a track being mounted to the outer wall and being spaced from the door in the second rotational direction;
   a slider being slidably mounted to the track, the paddle engaging the slider when the paddle approaches the door such that the slider moves along the track;
   a cable being coupled to and extending between the slider and the door; and
   a guide being coupled to the cable such that the cable is directed to pull the door toward the closed position when the slider is moved toward the door.

6. The system of claim 5, wherein the track comprises a groove extending through the outer wall from a closed end to an open end adjacent to the door, the slider comprising a base member and an engagement member, the base member being positioned in the groove, the engagement member being pivotably coupled to the base member, a first portion of the engagement member extending inwardly from the outer wall when the slider is positioned at the closed end of the groove to engage the paddle, a second portion of the engagement member being positioned in the groove when the slider is positioned at the closed end of the groove to maintain an orientation of the first portion with respect to the groove, the second portion extending out of the groove when the slider is positioned at the open end of the groove such that the engagement member is pivotable outwardly from the outer wall to disengage from the paddle.

7. The system of claim 5, wherein the guide comprises a frame being mounted on an exterior of the outer wall and a plurality of pulleys being mounted to the frame, the cable engaging each of the plurality of pulleys such that the cable extends along a path extending from the door to the opening door and from the opening around the outer wall to the slider, the guide engaging the cable to move along the path when the slider moves toward the door.

8. The system of claim 1, wherein the turbine section further comprises a sealing ring being coupled to the pair of arms and being positioned in the circumferential slot of the inner wall, the sealing ring forming a seal with the inner wall such that the sealing ring is configured for preventing air from moving through the circumferential slot.

9. The system of claim 8, wherein the sealing ring comprises a sealing member which engages an exterior surface of the inner wall to form the seal, the sealing member comprising a flexible material such that the sealing member conforms to the exterior surface of the inner wall, the sealing ring comprising a support member which extends through the circumferential slot and comprises a rigid material to maintain a position of the sealing member against the inner wall.

10. The system of claim 1, further comprising:
   a housing is coupled to and contains the plurality of turbine sections and the generator within an interior space defined in the housing, the outlet of the topmost turbine section extending out of the interior space through the housing, the housing having a plurality of inlets extending therethrough to the interior space; and
   a plurality of hatches being coupled to the housing, each hatch of the plurality of hatches being coupled to the housing and being movable between an open position and a closed position with respect to an associated one of the plurality of inlets, each hatch of the plurality of hatches being biased toward the closed position.

11. The system of claim 10, wherein each hatch of the plurality of hatches is configured to close via a gravitational force exerted on the hatch.

12. The system of claim 10, further comprising a plurality of mesh screens, each mesh screen of the plurality of mesh screens covering an associated one of the outlet of the topmost turbine section and the plurality of inlets of the housing.

13. The system of claim 10, further comprising a divider wall being mounted in the housing and extending horizontally such that the divider wall defines an upper compartment and a lower compartment, the upper compartment containing the turbine section, the lower compartment containing the generator, the lower compartment having a size such that the lower compartment is configured for containing a pair of electric vehicles.

14. The system of claim 13, further comprising a charger being mounted to the housing and positioned in the lower compartment, the charger being electrically coupled to the generator and comprising a battery for storing electrical power produced by the generator, the charger being configured for electrically charging each of the pair of electric vehicles.

15. A wind-powered electricity generating system comprising:
   a plurality of turbine sections being arranged in a stack, each turbine section of said plurality of turbine sections comprising:
      a duct having a bottom wall, a top wall, an inner wall, and an outer wall, each of the inner wall and the outer wall being coupled to and extending between the bottom wall and the top wall, each of the inner wall and the outer wall having a cylindrical shape, an outer channel being defined between the inner wall and the outer wall, an inner chamber being defined within the inner wall, the inner wall having a pair of apertures extending therethrough, the pair of apertures being positioned opposite each other, the outer wall having a pair of openings extending therethrough, the pair of openings being positioned opposite each other;
      a shaft being mounted in the inner chamber of the duct and being oriented vertically;
      a pair of arms, each arm of the pair of arms being coupled to and extending radially from the shaft, each arm of the pair of arms extending through a circumferential slot in the inner wall of the duct;
      a pair of paddles, each paddle of the pair of paddles being coupled to an associated arm of the pair of arms and being positioned in the outer channel of the duct, the pair of paddles being movable through the outer channel in each of a first rotational direction and a second rotational direction opposite the first rotational direction around the inner wall, each paddle of the pair of paddles extending from the inner wall to the outer wall and from the top wall to the bottom wall;
      a pair of doors, each door of the pair of doors being coupled to the outer wall of the duct and being movable between an open position and a closed position with respect to an associated one of the pair of openings, each door of the pair of doors extending from the outer wall to the inner wall and from the top wall to the bottom wall when in the open position such that the door is configured to permit air flowing through the associated opening to move only in the first rotational direction around the inner wall, each door of the pair of doors being positioned adjacent to an associated aperture of the pair of apertures of the inner wall such that the door is configured to direct air flowing through the outer channel in the first direction through the associated aperture into the inner chamber;

wherein each paddle of the pair of paddles is configured to be moved by the air through the outer channel in the first rotational direction when the air flows through the outer channel in the first rotational direction;

a pair of closure mechanisms, each closure mechanism of the pair of closure mechanisms being operatively coupled to an associated one of the pair of doors, each closure mechanism of the pair of closure mechanisms being actuatable by either paddle of the pair of paddles to close the associated door when either paddle approaches the associated door, each closure mechanism of the pair of closure mechanisms comprising:

a track being mounted to the outer wall and being spaced from the associated door in the second rotational direction, the track comprising a groove extending through the outer wall from a closed end to an open end adjacent to the associated door;

a slider being slidably mounted to the track, each paddle of the pair of paddles engaging the slider when the paddle approaches the associated door such that the slider moves along the track, the slider comprising a base member and an engagement member, the base member being positioned in the groove, the engagement member being pivotably coupled to the base member, a first portion of the engagement member extending inwardly from the outer wall when the slider is positioned at the closed end of the groove to engage either paddle of the pair of paddles, a second portion of the engagement member being positioned in the groove when the slider is positioned at the closed end of the groove to maintain an orientation of the first portion with respect to the groove, the second portion extending out of the groove when the slider is positioned at the open end of the groove such that the engagement member is pivotable outwardly from the outer wall to disengage from the paddle;

a cable being coupled to and extending between the slider and the associated door; and a guide being coupled to the cable such that the cable is directed to pull the associated door toward the closed position when the slider is moved toward the associated door, the guide comprising a frame being mounted on an exterior of the outer wall and a plurality of pulleys being mounted to the frame, the cable engaging each of the plurality of pulleys such that the cable extends along a path extending from the associated door to the opening associated with the associated door and from the opening around the outer wall to the slider, the guide engaging the cable to move along the path when the slider moves toward the door; and a sealing ring being coupled to the pair of arms and being positioned in the circumferential slot of the inner wall, the sealing ring forming a seal with the inner wall such that the sealing ring is configured for preventing air from moving through the circumferential slot, the sealing ring comprising a sealing member which engages an exterior surface of the inner wall to form the seal, the sealing member comprising a flexible material such that the sealing member conforms to the exterior surface of the inner wall, the sealing ring comprising a support member which extends through the circumferential slot and comprises a rigid material to maintain a position of the sealing member against the inner wall;

wherein the shafts of the plurality of turbine sections are coupled together, the inner chambers of the plurality of turbine sections being in fluid communication with each other, a topmost turbine section of the plurality of turbine sections having an outlet extending through the top wall of the topmost turbine section to the inner chamber;

a generator being operatively coupled to the shaft of a bottommost turbine section of the plurality of turbine sections;

a housing being coupled to and containing the plurality of turbine sections and the generator within an interior space defined in the housing, the outlet of the topmost turbine section extending out of the interior space through the housing, the housing having a plurality of inlets extending therethrough to the interior space;

a plurality of hatches being coupled to the housing, each hatch of the plurality of hatches being coupled to the housing and being movable between an open position and a closed position with respect to an associated one of the plurality of inlets, each hatch of the plurality of hatches being biased toward the closed position, each hatch of the plurality of hatches being configured to close via a gravitational force exerted on the hatch;

a plurality of mesh screens, each mesh screen of the plurality of mesh screens covering an associated one of the outlet of the topmost turbine section and the plurality of inlets of the housing;

a divider wall being mounted in the housing and extending horizontally such that the divider wall defines an upper compartment and a lower compartment, the upper compartment containing the plurality of turbine sections, the lower compartment containing the generator, the lower compartment having a size such that the lower compartment is configured for containing a pair of electric vehicles; and a charger being mounted to the housing and positioned in the lower compartment, the charger being electrically coupled to the generator and comprising a battery for storing electrical power produced by the generator, the charger being configured for electrically charging each of the pair of electric vehicles.

* * * * *